United States Patent
Ohide

(10) Patent No.: US 8,477,169 B2
(45) Date of Patent: Jul. 2, 2013

(54) OPTICAL WRITING DEVICE, IMAGE FORMING APPARATUS, AND OPTICAL WRITING METHOD

(75) Inventor: Toshio Ohide, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 298 days.

(21) Appl. No.: 12/880,563

(22) Filed: Sep. 13, 2010

(65) Prior Publication Data

US 2011/0063401 A1 Mar. 17, 2011

(30) Foreign Application Priority Data

Sep. 14, 2009 (JP) ................................. 2009-211693

(51) Int. Cl.
*B41J 2/455* (2006.01)
*B41J 2/435* (2006.01)

(52) U.S. Cl.
USPC ............ 347/233; 347/234; 347/235; 347/237

(58) Field of Classification Search
USPC .......................... 347/233–235, 248, 250, 237
See application file for complete search history.

(56) References Cited

U.S. PATENT DOCUMENTS

| 6,185,026 B1 * | 2/2001 | Hayashi et al. ............ 359/204.1 |
| 7,247,840 B2 * | 7/2007 | Takeyama et al. ............ 250/234 |

FOREIGN PATENT DOCUMENTS

JP 3850593 9/2006

* cited by examiner

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

An optical writing device includes two or more light sources. The two or more light sources can be driven independently, are placed away from each other in a sub-scanning direction of a photoreceptor, and each distance of beams emitted from the light sources to the photoreceptor is different. A phase control unit causes a difference in phase among timing control data of two or more beams emitted from the two or more light sources by a phase change amount, which is determined on the basis of beam position of the each beam on the photoreceptor in a main scanning direction and varies depending on the beam position. The modulating unit modulates the timing control data of the respective phase-controlled beams by a same clock.

13 Claims, 9 Drawing Sheets

OPTICAL WRITING DEVICE, IMAGE FORMING APPARATUS, AND OPTICAL WRITING METHOD

CROSS-REFERENCE TO RELATED APPLICATIONS

The present application claims priority to and incorporates by reference the entire contents of Japanese Patent Application No. 2009-211693 filed in Japan on Sep. 14, 2009.

BACKGROUND OF THE INVENTION

1. Field of the Invention

The present invention relates to generally an optical writing device, an image forming apparatus, and an optical writing method.

2. Description of the Related Art

Conventionally, there has been known an optical writing device that performs optical writing by causing beams emitted from a plurality of light sources, which can be independently driven, to fall on the surface of a photoreceptor depending on an image signal. In such a device that performs optical writing using multiple beams in this way, the beams may differ in write width, and this leads to a problem of positional deviation of the beams. As a method for resolving such positional deviation of beams, for example, Japanese Patent No. 3850593 discloses a method for making a plurality of light sources differ from one another in modulation frequency.

However, in the method disclosed in Japanese Patent No. 3850593, it is necessary to provide a means for changing the modulation frequency to each of the light sources, and this causes a problem of an increase in the circuit size when the number of beams is large.

The present invention has been made in consideration of the above, and an object of the present invention is to provide an optical writing device, an image forming apparatus, and an optical writing method capable of adjusting write widths of multiple beams without causing an increase in the circuit size due to an increase in the number of light sources.

SUMMARY OF THE INVENTION

It is an object of the present invention to at least partially solve the problems in the conventional technology.

According to an aspect of the present invention, there is provided an optical writing device that includes: two or more light sources that can be driven independently and are placed away from each other in a sub-scanning direction of a photoreceptor, wherein each distance of beams emitted from the light sources to the photoreceptor is different; a phase control unit that causes a difference in phase among timing control data of two or more beams emitted from the two or more light sources by a phase change amount, wherein the phase change amount is an amount determined on the basis of beam position of the each beam on the photoreceptor in a main scanning direction and varies depending on the beam position; and a modulating unit that modulates the timing control data of the respective beams phase-controlled by the phase control unit by using a same clock.

According to another aspect of the present invention, there is provided an image forming apparatus that includes: two or more light sources that can be driven independently and are placed away from each other in a sub-scanning direction of a photoreceptor, wherein each distance of beams emitted from the light sources to the photoreceptor is different; a phase control unit that causes a difference in phase among timing control data of two or more beams emitted from the two or more light sources by a phase change amount, wherein the phase change amount is an amount determined on the basis of beam position of each beam on the photoreceptor in a main scanning direction and varies depending on the beam position; and a modulating unit that modulates the timing control data of the respective beams phase-controlled by the phase control unit by using a same clock.

According to still another aspect of the present invention, there is provided an optical writing method of an optical writing device that includes two or more light sources, the two or more light sources capable of being driven independently, the two or more light sources being placed away from each other in a sub-scanning direction of a photoreceptor and each distance of beams emitted from the two or more light sources to the photoreceptor being different, the optical writing method includes: a phase control step of causing a difference in phase among timing control data of two or more beams emitted from the two or more light sources by a phase change amount which is determined on the basis of beam position of the each beam on the photoreceptor in a main scanning direction and varies depending on the beam position; and a modulating unit step of modulating the timing control data of the respective beams phase-controlled at the phase control step by using a same clock.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical writing device, an image forming apparatus, and an optical writing method according to the present invention are explained in detail below with reference to the accompanying drawings.

First Embodiment

Figure 1:
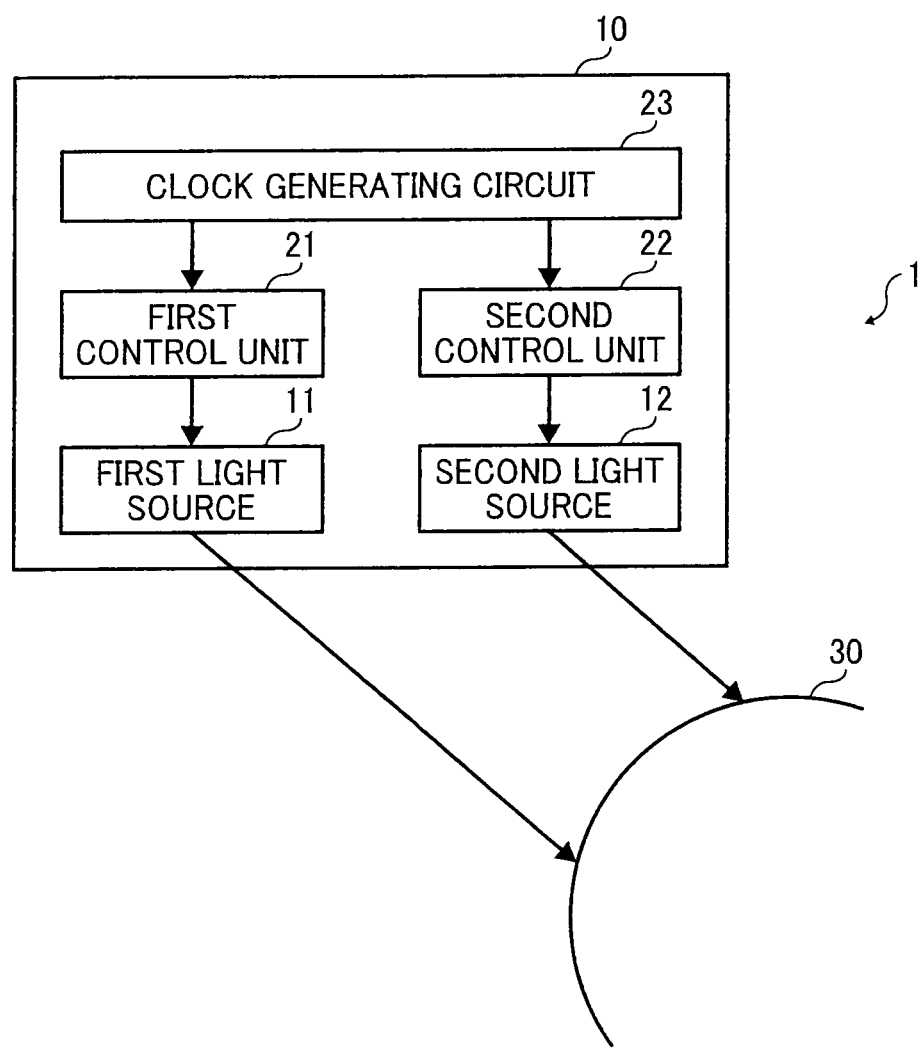
FIG. 1 is a diagram illustrating components of an image forming apparatus according to a first embodiment.

An image forming apparatus according to a first embodiment includes an optical writing device that includes two light sources, and performs optical writing on a photoreceptor by so-called multi-beam scanning. FIG. 1 is a diagram illustrating components of an image forming apparatus 1 according to the first embodiment. The image forming apparatus 1 includes an optical writing device 10 and a photoreceptor 30. The optical writing device 10 includes a first light source 11, a second light source 12, a first control unit 21, a second control unit 22, and a clock generating circuit 23. Each of the first light source 11 and the second light source 12 emits a beam to the photoreceptor 30 in accordance with a PWM signal generated depending on input image data under the control of the respective first control unit 21 and the second control unit 22. The first control unit 21 and the second control unit 22 each process the image data in each clock generated by the clock generating circuit 23 and generate a PWM signal.

Figure 2A:
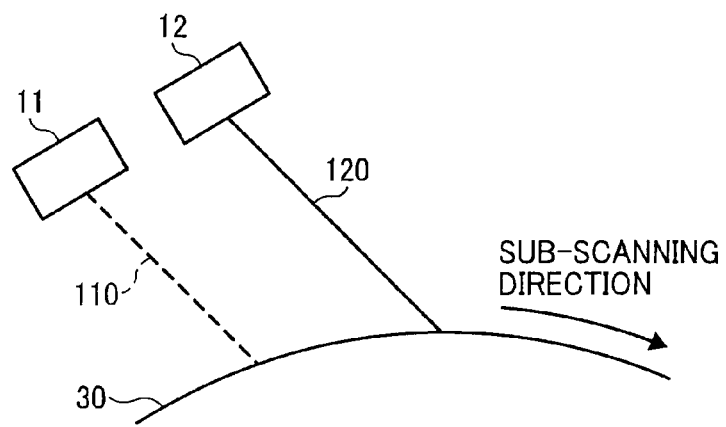
FIG. 2A is a diagram explaining a positional relationship among a first light source, a second light source, and a photoreceptor.
Figure 2B:
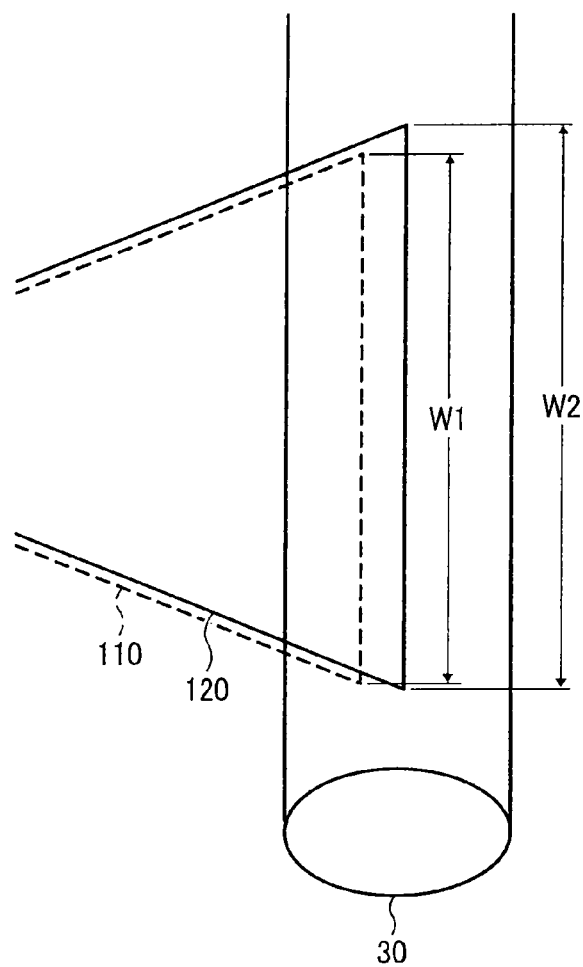
FIG. 2B is another diagram explaining the positional relationship among the first light source, the second light source, and the photoreceptor.

FIGS. 2A and 2B are diagrams explaining a positional relationship among the first light source 11, the second light source 12, and the photoreceptor 30. As shown in FIG. 2A, the first light source 11 and the second light source 12 are placed away from each other along a rotating direction of the photoreceptor 30, i.e., a sub-scanning direction. Beams emitted from the first light source 11 and the second light source 12 are obliquely incident on the photoreceptor 30. Namely, a beam travel distance 110 from the first light source 11 to the photoreceptor 30 is different from a beam travel distance 120 from the second light source 12 to the photoreceptor 30.

Due to the placement of the first light source 11 and the second light source 12 away from each other, as shown in FIG. 2B, a write width W1 of the beam from the first light source 11 on the photoreceptor 30 in a main scanning direction is slightly different from a write width W2 of the beam from the second light source 12 on the photoreceptor 30 in the main scanning direction. The first control unit 21 and the second control unit 22 according to the present embodiment correct a difference between the write widths W1 and W2.

Figure 3:
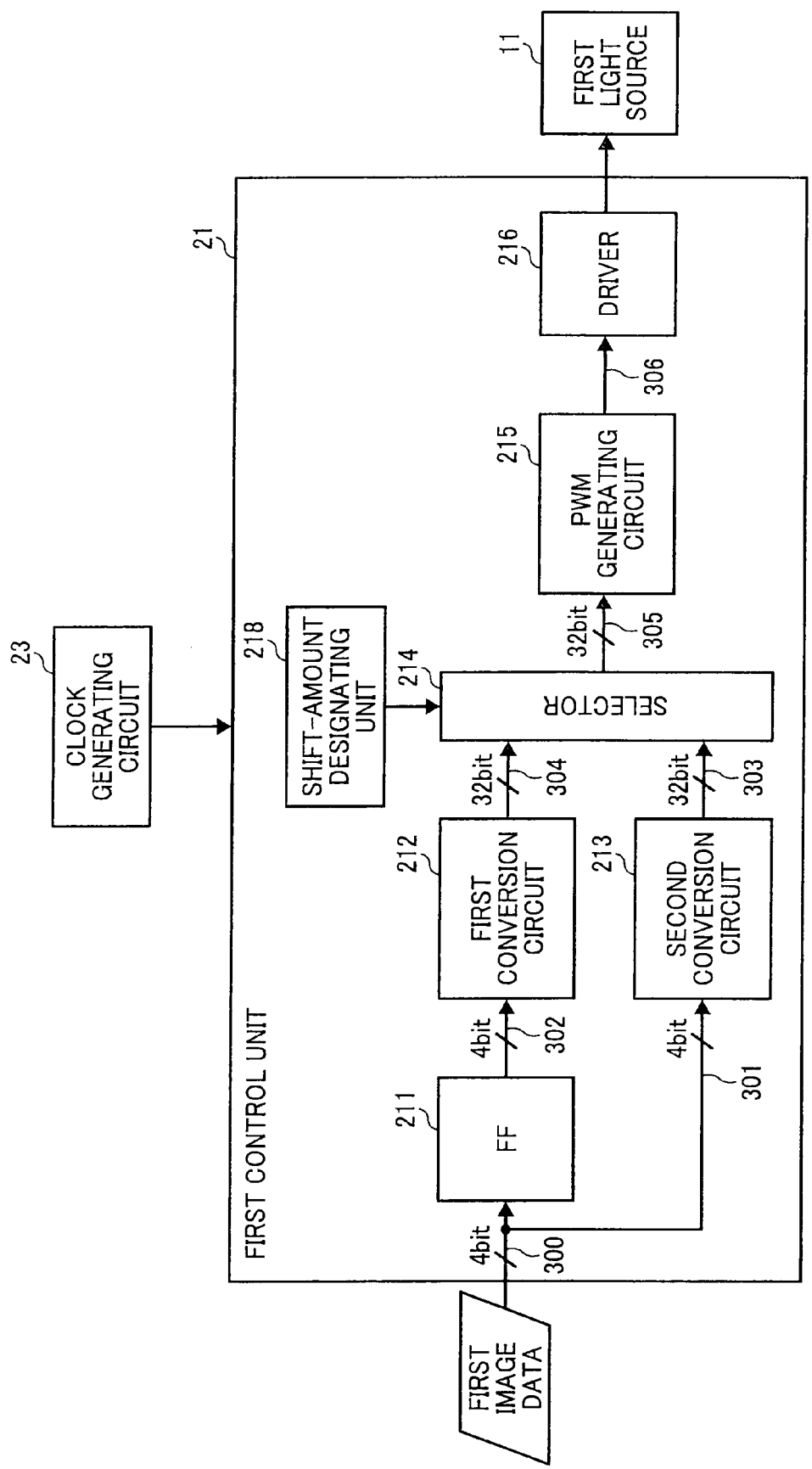
FIG. 3 is a block diagram illustrating a detailed configuration of a first control unit.

FIG. 3 is a block diagram illustrating a detailed configuration of the first control unit 21. The first control unit 21 has a flip-flop circuit (FF) 211, a first conversion circuit 212, a second conversion circuit 213, a selector 214, a PWM generating circuit 215, a driver 216, and a shift-amount designating unit 218.

First image data input to the first control unit 21 is input to the FF 211 and the second conversion circuit 213. The FF 211 generates a 1-clock-delayed image signal 302 from the first image data, and outputs the generated image signal 302 to the first conversion circuit 212.

Consequently, an image signal for continuous two pixels in the main scanning direction is input to the first conversion circuit 212 and the second conversion circuit 213 at the same timing. The first conversion circuit 212 converts the input 4-bit image signal 302 into a 32-bit image signal 304, and then outputs the converted image signal 304 to the selector 214.

The second conversion circuit 213 has the same configuration as the first conversion circuit 212. The second conversion circuit 213 converts a 4-bit image signal 300 directly input from outside without involving the FF 211 into a 32-bit image signal 303, and then outputs the converted image signal 303 to the selector 214.

The selector 214 connects the image signals 304 and 303 input from the first and second conversion circuits 212 and 213, and obtains a 64-bit image signal. The obtained 64-bit image signal is an image signal corresponding to the two pixels.

The selector 214 cuts out 32-bit data from the obtained 64-bit image signal, and then outputs the cut 32-bit image signal 305 to the PWM generating circuit 215.

Figure 4:
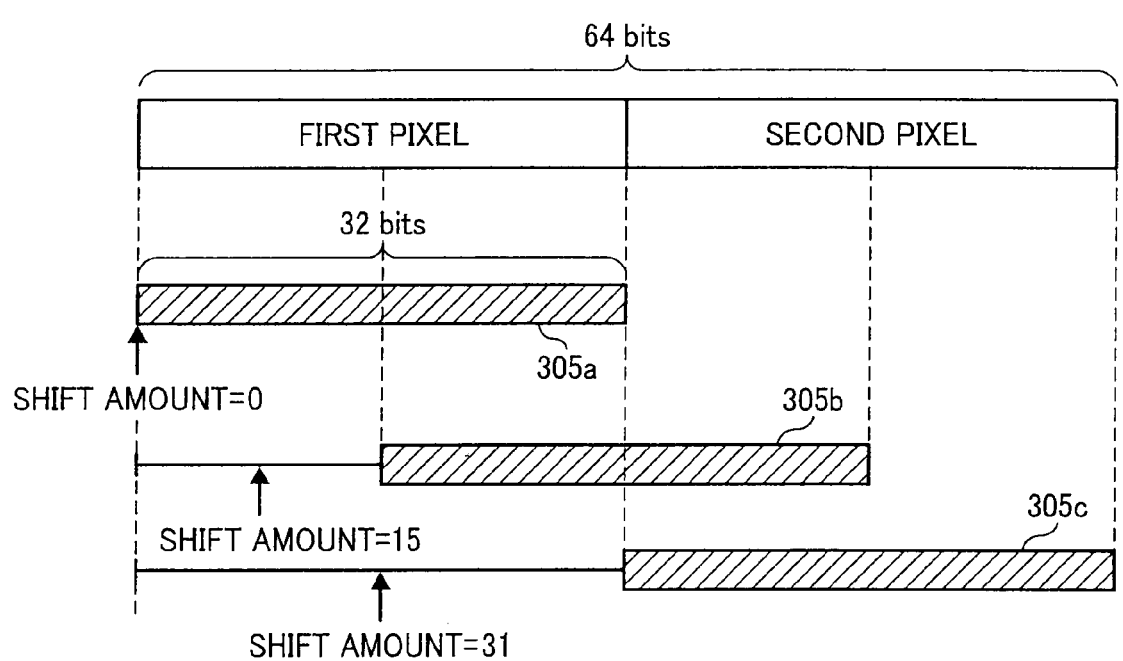
FIG. 4 is a diagram explaining a shift amount.

Incidentally, the selector 214 designates a cut position on the basis of a shift amount designated by the shift-amount designating unit 218. The shift amount here means an amount of displacement to the head position of the 32-bit data cut from the 64-bit image signal. FIG. 4 is a diagram explaining the shift amount. As shown in FIG. 4, for example, when a shift amount of 0 is designated, out of 64-bit data corresponding to data for two pixels, 32-bit data corresponding to the first pixel is output from the selector 214. When a shift amount of 15 is designated, 32-bit data from the 17th bit of the first pixel to the 16th bit of the second pixel is output from the selector 214. When a shift amount of 31 is designated, 32-bit data corresponding to the second pixel is output from the selector 214. In this manner, the selector 214 outputs a phase-shifted 1-pixel-wide data from the image signal for continuous two pixels.

Incidentally, the shift-amount designating unit 218 of the first control unit 21 designates a fixed value as a shift amount. Specifically, the shift-amount designating unit 218 designates the one-half value of the maximum shift amount as the fixed value. In the present embodiment, the maximum shift amount is 31, and the fixed value designated by the shift-amount designating unit 218 is 15. The selector 214 and the shift-amount designating unit 218 correspond to a phase control unit.

The PWM generating circuit 215 converts the input 32-bit image signal 305 into a PWM signal 306 of the thirty-second resolution, and outputs the PWM signal 306 to the driver 216. The driver 216 drives the first light source 11 in accordance with the PWM signal 306. The PWM generating circuit 215 corresponds to a modulating unit.

Figure 5:
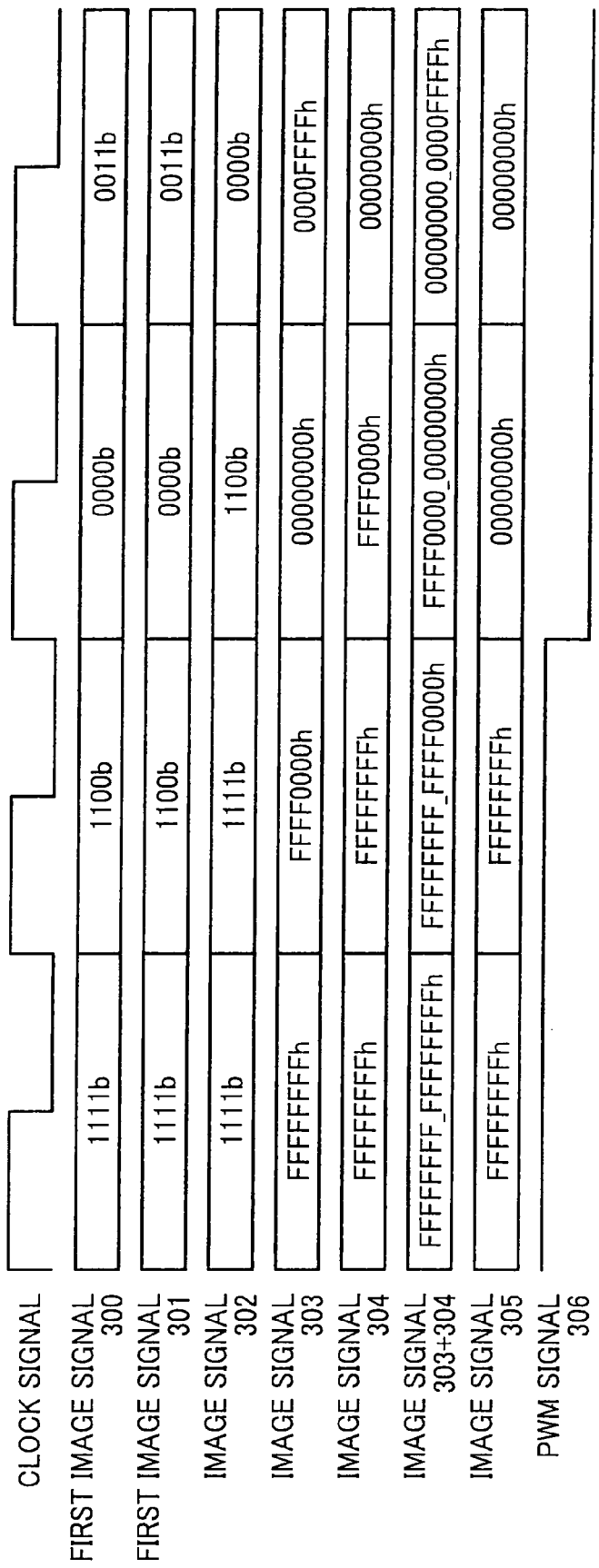
FIG. 5 is a timing chart illustrating a circuit operation of the first control unit.

FIG. 5 is a timing chart illustrating the circuit operation of the first control unit 21. The first image signal 300 and the first image signal 301 input to the FF 211 and the second conversion circuit 213, respectively, are the same image data. The image signal 302 output from the FF 211 is a signal that the first image signal 300 is delayed by one clock. The image signal 303 is a signal that the image signal 301 is converted into 32-bit data, and the image signal 304 is a signal that the image signal 302 is converted into 32-bit data. The image signal 303+304 is data that the image signal 303 and the image signal 304 are connected, and is data obtained by the selector 214.

In the first control unit 21, a shift amount of 15 is designated by the shift-amount designating unit 218, so an image signal that the last 16 bits of the image signal 303 and the first 16 bits of the image signal 304 are connected is output from the selector 214 as an image signal 305. Then, the PWM signal 306 is generated from the image signal 305.

Figure 6:
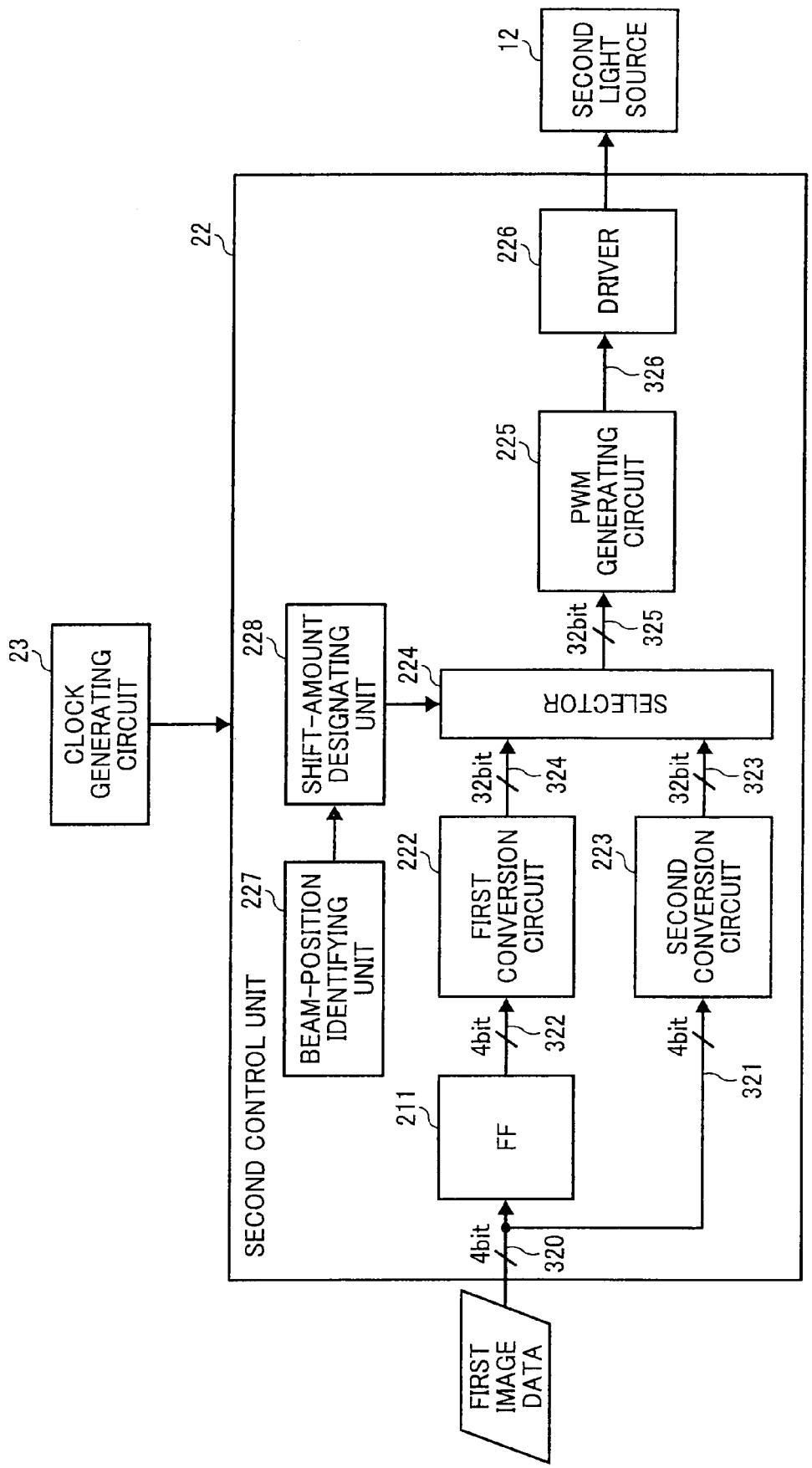
FIG. 6 is a block diagram illustrating a detailed configuration of a second control unit.

FIG. 6 is a block diagram illustrating a detailed configuration of the second control unit 22. The configuration of the second control unit 22 is almost the same configuration as the first control unit 21; however, the second control unit 22 further includes a beam-position identifying unit 227 in addition to the same components as the first control unit 21.

The beam-position identifying unit 227 counts the number of clocks generated by the clock generating circuit 23, thereby identifying a beam position of the first light source 11 in the main scanning direction. Specifically, the beam-position identifying unit 227 identifies the beam position, for example, depending on the number of clocks counted from the timing when a synchronization detection element (not shown) provided at the scan start position of the photoreceptor 30 in the main scanning direction detects the beam.

A shift-amount designating unit 228 determines a shift amount on the basis of the beam position identified by the beam-position identifying unit 227. Then, the shift-amount designating unit 228 designates the determined shift amount with respect to a selector 224. Incidentally, the selector 224 and the shift-amount designating unit 228 correspond to a phase control unit. Furthermore, a PWM generating circuit 225 corresponds to a modulating unit.

Figure 7:
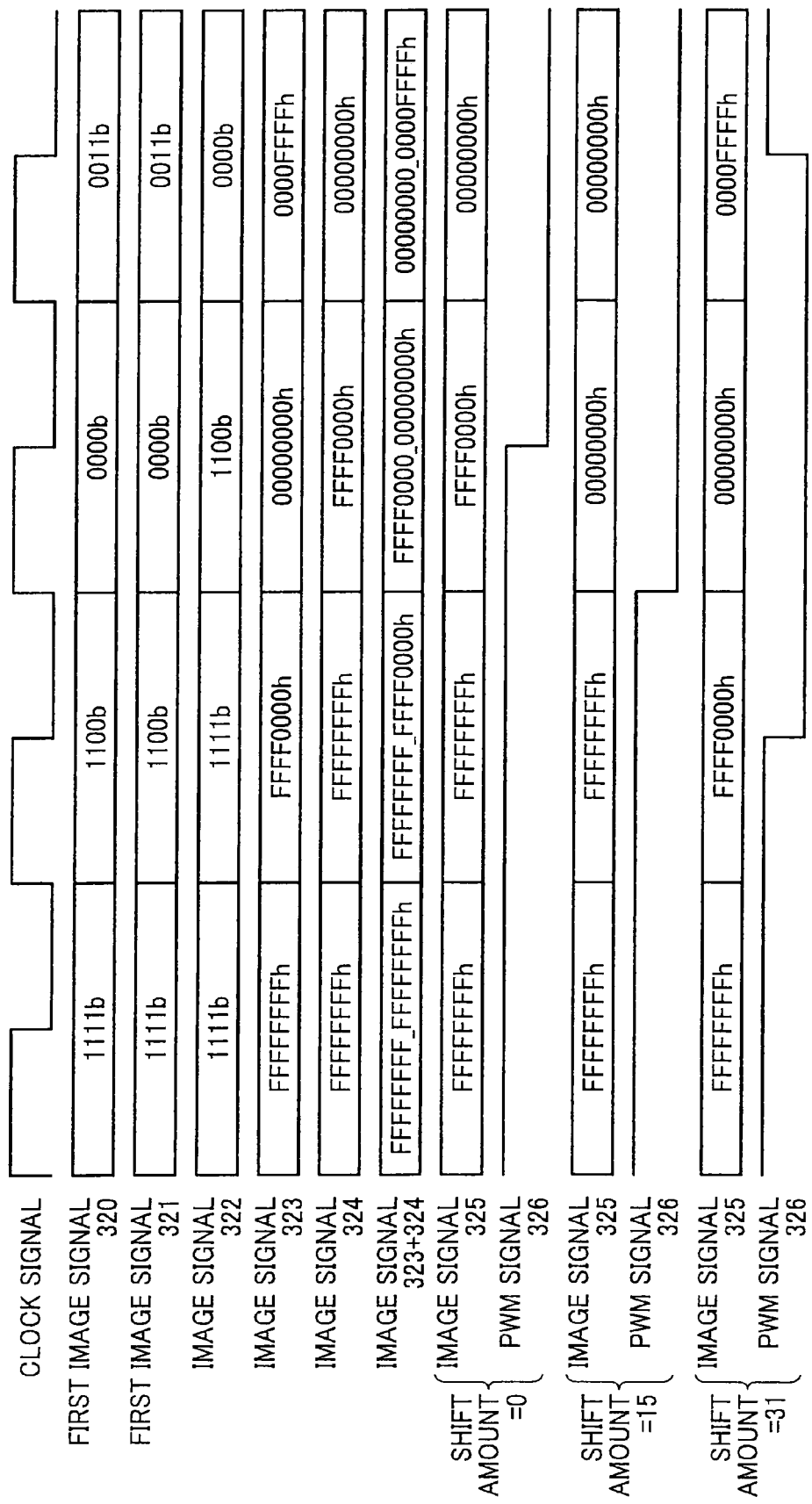
FIG. 7 is a timing chart illustrating a circuit operation of the second control unit.

FIG. 7 is a timing chart illustrating the circuit operation of the second control unit 22. In the case where the shift amount is 0, as shown in FIG. 7, the same image signal as an image signal 323 is output from the selector 224 as an image signal 325. Then, a PWM signal 326 is generated from the image signal 325.

In the case where the shift amount is 15, an image signal that the last 16 bits of the image signal 323 and the first 16 bits of an image signal 324 are connected is output from the selector 224 as an image signal 325. Then, the PWM signal 326 is generated from the image signal 325.

In the case where the shift amount is 31, the same image signal as the image signal 324 is output from the selector 224 as an image signal 325. Then, the PWM signal 326 is generated from the image signal 325.

As shown in FIG. 7, the PWM signals 326 generated from the image signals 325 obtained with respect to the different shift amounts are different data. Therefore, by changing the shift amount in the second control unit 22 depending on the beam position while the shift amount in the first control unit 21 is set down as a fixed value, the write width of the second light source 12 on the photoreceptor 30 can be totally increased or decreased.

Figure 8:
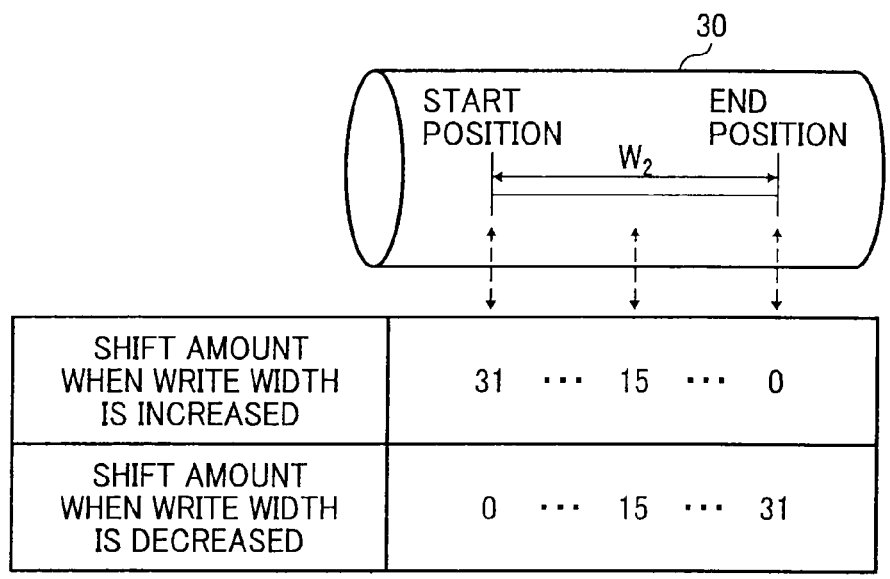
FIG. 8 is a diagram schematically illustrating a relationship between a beam position and a shift amount determined by a shift-amount designating unit.

FIG. 8 is a diagram schematically illustrating a relationship between the beam position and the shift amount determined by the shift-amount designating unit 228. For example, when the write width of the second light source 12 is increased by a width corresponding to one pixel, the shift-amount designating unit 228 changes the shift amount from 31 to 0 between the start point and the end point in the main scanning direction depending on the beam position. On the contrary, when the write width of the second light source 12 on the photoreceptor 30 is decreased by a width corresponding to one pixel, the shift-amount designating unit 228 changes the shift amount from 0 to 31 between the write start position and the write end position in the main scanning direction depending on the beam position.

In the case of increasing the write width, the shift-amount designating unit 228 sets the initial value of the shift amount to 31. Furthermore, the shift-amount designating unit 228 sets a distance $W_x$ in the main scanning direction and a number N to be added with each clock in a register (not shown). Then, when a result of the addition exceeds $W_x$ by the addition of N with each clock, the shift-amount designating unit 228 subtracts 1 from the shift amount. By the above process, the shift amount can be changed from 31 to 0 in a main scanning width $W_2$ at equal intervals. Namely, the write width can be uniformly increased without any distortion in the main scanning width $W_2$.

On the contrary, in the case of decreasing the write width, the shift-amount designating unit 228 sets the initial value of the shift amount to 0. Furthermore, the shift-amount designating unit 228 sets the distance $W_x$ in the main scanning direction and the number N to be added in the register. Then, when a result of the addition exceeds $W_x$ by the addition of N with each clock, the shift-amount designating unit 228 adds 1 to the shift amount. Thus, the shift amount can be changed from 0 to 31 in the main scanning width $W_2$. By the above process, also in the case of the decrease, the shift amount can be changed in the main scanning width $W_2$ at equal intervals.

As described above, in the image forming apparatus 1 according to the present embodiment, under the control of a single clock, a phase of a PWM signal of the first light source 11 is fixed and a phase of a PWM signal of the second light source 12 is gradually changed depending on the beam position, thereby causing a difference in phase of the PWM signal between the first light source 11 and the second light source 12. By causing the difference in phase in this manner, the write widths of the two beams can be adjusted without causing an increase in the circuit size due to an increase in the number of light sources.

Incidentally, in the image forming apparatus 1 according to the first embodiment, the write width of the first light source 11 is fixed, and the write width of the second light source 12 is corrected; alternatively, as a first variation, the write width of the second light source 12 can be fixed, and the write width of the first light source 11 can be corrected.

Furthermore, as a second variation, the phases of the PWM signals of both the first light source 11 and the second light source 12 can be changed depending on the beam position in order to correct the write widths of both the first light source 11 and the second light source 12. For example, in the case of decreasing the write width of the second light source 12 by a width corresponding to one pixel, the shift amount of the first light source 11 is changed from 15 to 0, and the shift amount of the second light source 12 is changed from 16 to 31. In this manner, as long as the first light source 11 and the second light source 12 differ in phase of the PWM signal, the phase of either PWM signal can be changed.

Figure 9:
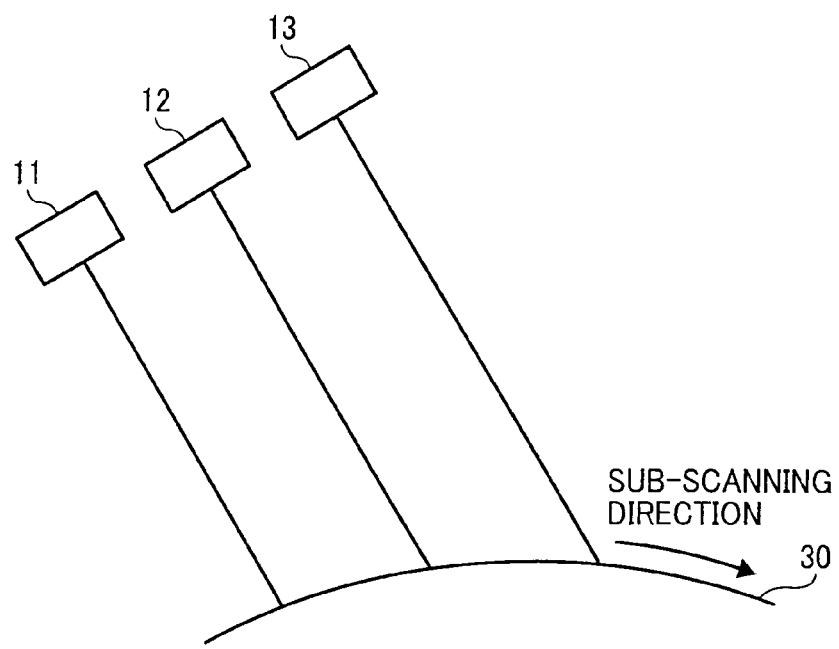
FIG. 9 is a diagram illustrating installation positions of three light sources.

Moreover, as a third variation, the image forming apparatus 1 can include three or more light sources. In this case, the optical writing device includes a plurality of control units corresponding to the respective light sources. Incidentally, the control units operate according to the same clock generated by the clock generating circuit. FIG. 9 is a diagram illustrating the installation positions of three light sources. In this manner, when the first light source 11, the second light source 12, and a third light source 13 are arranged on the photoreceptor 30 along the sub-scanning direction, a shift amount of a reference light source (the first light source 11, in this case) is a fixed value, and shift amounts of light sources other than the reference light source (the second light source 12 and the third light source 13, in this case) are changed depending on the beam position. Furthermore, in this case, the second light source 12 and the third light source 13 are configured to differ in amount of change in the shift amount of the PWM signal from each other depending on distances thereof to the first light source 11.

Specifically, when the write widths of the second light source 12 and the third light source 13 are increased, the shift amount in the second light source 12 is decreased from 15 to 0 depending on the beam position in the direction from the start position to the end position. Furthermore, the shift amount in the third light source 13 is decreased from 31 to 0 depending on the beam position in the direction from the start position to the end position.

On the other hand, when the write widths of the second light source 12 and the third light source 13 are decreased, the shift amount in the second light source 12 is increased from 15 to 31 depending on the beam position in the direction from the start position to the end position. Furthermore, the shift amount in the third light source 13 is decreased from 0 to 31 depending on the beam position in the direction from the start position to the end position.

Furthermore, in the present embodiment, the configuration for one photoreceptor 30 is described. As a fourth variation, there is described the case where the image forming apparatus forms an image using four color plates, i.e., includes four photoreceptors and four optical writing devices. The configuration and operation of each of the photoreceptors and each of the optical writing devices are the same as the photoreceptor and the optical writing device described in the present embodiment. In the image forming apparatus having the four photoreceptors, it is possible to prevent an image defect due to a difference in write width among a plurality of beams from occurring in the color plates, so the position accuracy of the four color plates when being superimposed can be improved. Namely, the quality of a color image can be improved.

Moreover, as a fifth variation, the input image data can be data other than 4-bit data. Furthermore, in the present embodiment, the PWM resolution is the thirty-second resolution; however, the PWM resolution can be the resolution enough to keep from causing an image defect by shifting the phase, and is not limited to the embodiment.

Second Embodiment

Subsequently, an image forming apparatus according to a second embodiment is explained. The image forming apparatus according to the second embodiment detects a write width of each light source and determines a shift amount on the basis of the write width of each light source.

Figure 10:
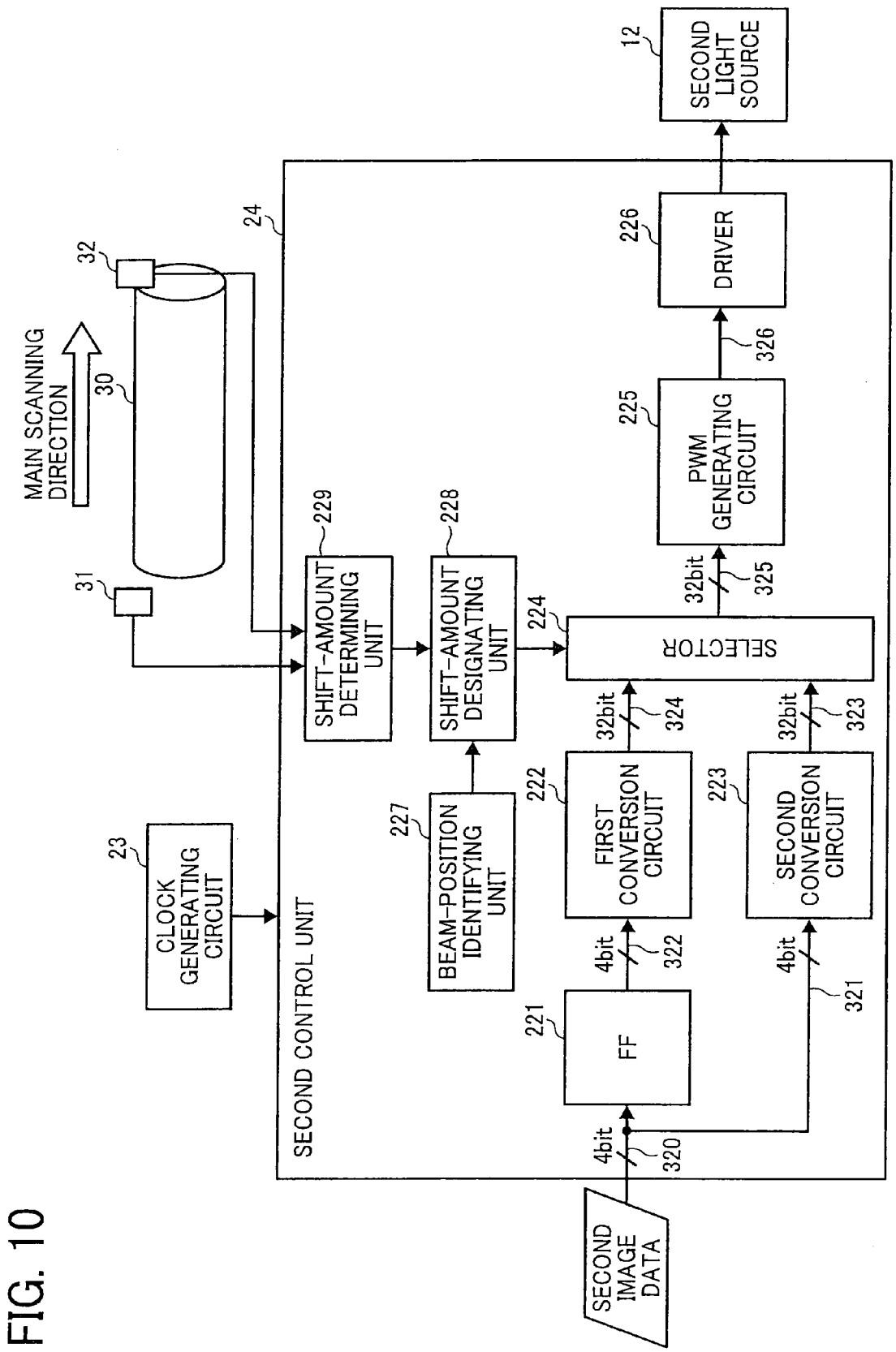
FIG. 10 is a block diagram of a second control unit according to a second embodiment.

FIG. 10 is a block diagram of a second control unit 24 according to the second embodiment. The second control unit 24 according to the second embodiment further includes a shift-amount determining unit 229 in addition to the same components as the second control unit 22 according to the first embodiment. Furthermore, at both ends of the photoreceptor 30, two synchronization detection elements 31 and 32 are provided as optical sensors. When the first synchronization detection element 31 detects a beam passing through the write start position in the main scanning direction, the first synchronization detection element 31 outputs a detection signal. Similarly, when the second synchronization detection element 32 detects a beam passing through the write end position in the main scanning direction, the second synchronization detection element 32 outputs a detection signal.

The shift-amount determining unit 229 measures write widths of the first light source 11 and the second light source 12 on the basis of results of the detection by the first and second synchronization detection elements 31 and 32. Specifically, only a beam subject to the measurement is lit, and an interval time which is the interval between an output time of the detection signal output from the first synchronization detection element 31 and an output time of the detection signal output from the second synchronization detection element 32 is calculated. The interval time is a value equivalent to the write width. Due to the fact that the first light source 11 and the second light source 12 differ in travel distance to the photoreceptor 30, there is a difference in the obtained interval time between the first light source 11 and the second light source 12. The shift-amount determining unit 229 determines a change width of the shift amount changed in scanning in the main scanning direction on the basis of the difference in the interval time. Incidentally, the shift-amount determining unit 229 corresponds to a phase-change-amount determining unit.

For example, it is assumed that the interval time calculated from beams of the first light source 11 is 500 us (corresponding to 15118 clocks) and the interval time calculated from beams of the second light source 12 is 500.03 us. As 500.03 us corresponds to 15118+29/32 clocks, the shift-amount determining unit 229 determines that a change width of the shift amount of the second light source 12 is 29, in this case. Incidentally, the shift amount of the first light source 11 is fixed at 15 in the same manner as in the first embodiment.

The shift-amount designating unit 228 changes the shift amount by the change width of 29, i.e., from 31 to 2 in accordance with the width of the shift amount determined by the shift-amount determining unit 229 depending on the beam position identified by the beam-position identifying unit 227.

In this manner, in the image forming apparatus according to the second embodiment, the write widths of the first light source 11 and the second light source 12 are measured, and a change width of the shift amount can be determined depending on a result of the measurement.

Incidentally, the image forming apparatus can be a multifunction peripheral having at least any two of a copier function, a printer function, a scanner function, and a facsimile function, and can be applied to any image forming apparatuses, such as a copier, a printer, a scanner device, and a facsimile machine.

According to the present invention, it is possible to adjust write widths of multiple beams without causing an increase in circuit size due to an increase in the number of light sources.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical writing device comprising:
   two or more light sources that can be driven independently and are placed away from each other in a sub-scanning direction of a photoreceptor, wherein
   each distance of beams emitted from the light sources to the photoreceptor is different;
   a phase control unit that causes a difference in phase among timing control data of two or more beams emitted from the two or more light sources by a phase change amount, wherein the phase change amount is an amount determined on the basis of beam position of the each beam on the photoreceptor in a main scanning direction and varies depending on the beam position; and
   a modulating unit that modulates the timing control data of the respective beams phase-controlled by the phase control unit by using a same clock.

2. The optical writing device according to claim 1, wherein
   the optical writing device includes a first light source and a second light source,
   the phase control unit changes a phase of timing control data of a first beam emitted from the first light source by the phase change amount, and
   the modulating unit modulates the timing control data of the first beam in which the phase is changed and timing control data of a second beam emitted from the second light source by using the same clock.

3. The optical writing device according to claim 1, wherein
   the optical writing device includes three or more light sources,
   the phase control unit changes phases of timing control data of beams other than a first beam out of three or more beams emitted from the three or more light sources by the phase change amount, and the modulating unit modulates timing control data of the first beam and the timing control data of the beams other than the first beam in which the phases are changed by the phase control unit by using the same clock.

4. The optical writing device according to claim 1, further comprising:
two optical sensors that are placed at both ends of the photoreceptor in the main scanning direction; and
a phase-change-amount determining unit that determines a change width for changing the phase change amount in the main scanning direction on the basis of timings when the respective two or more beams scan positions corresponding to the two optical sensors,
wherein the phase control unit causes a difference in the phase within the change width.

5. An image forming apparatus comprising:
two or more light sources that can be driven independently and are placed away from each other in a sub-scanning direction of a photoreceptor, wherein
each distance of beams emitted from the light sources to the photoreceptor is different;
a phase control unit that causes a difference in phase among timing control data of two or more beams emitted from the two or more light sources by a phase change amount, wherein the phase change amount is an amount determined on the basis of beam position of each beam on the photoreceptor in a main scanning direction and varies depending on the beam position; and
a modulating unit that modulates the timing control data of the respective beams phase-controlled by the phase control unit by using a same clock.

6. An optical writing method of an optical writing device that includes two or more light sources, wherein the two or more light sources can be driven independently, and are placed away from each other in a sub-scanning direction of a photoreceptor, and each distance of beams emitted from the two or more light sources to the photoreceptor is different, the optical writing method comprising:
a phase control step of causing a difference in phase among timing control data of two or more beams emitted from the two or more light sources by a phase change amount that is determined on the basis of beam position of the each beam on the photoreceptor in a main scanning direction and varies depending on the beam position; and
a modulating step of modulating each of the timing control data of the respective beams phase-controlled at the phase control step by using a same clock.

7. The optical writing method according to claim 6, wherein
the optical writing device includes a first light source and a second light source,
the phase control step includes changing a phase of timing control data of a first beam emitted from the first light source by the phase change amount, and
the modulating step includes modulating the timing control data of the first beam in which the phase has been changed and timing control data of a second beam emitted from the second light source by using the same clock.

8. The optical writing method according to claim 6, wherein
the optical writing device includes three or more light sources,
the phase control step includes changing phases of timing control data of beams other than a first beam out of three or more beams emitted from the three or more light sources by the phase change amount, and
the modulating step includes modulating timing control data of the first beam and the timing control data of the beams other than the first beam in which the phases have been changed at the phase control step by using the same clock.

9. The optical writing method according to claim 6, further comprising a phase-change-amount determining step of determining a change width for changing the phase change amount in the main scanning direction on the basis of timings when the respective two or more beams scan positions in the main scanning direction corresponding to two optical sensors, which are placed at both ends of the photoreceptor in the main scanning direction, wherein
the phase control step includes causing a difference in the phase within the change width.

10. A computer program product comprising a non-transitory computer-readable medium having computer-readable program codes embodied in the medium for an optical writing of an optical writing device that includes two or more light sources, wherein the two or more light sources can be driven independently, and are placed away from each other in a sub-scanning direction of a photoreceptor, and each distance of beams emitted from the two or more light sources to the photoreceptor is different, the program codes when executed causing a computer to execute:
a phase control step of causing a difference in phase among timing control data of two or more beams emitted from the two or more light sources by a phase change amount that is determined on the basis of beam position of the each beam on the photoreceptor in a main scanning direction and that varies depending on the beam position; and
a modulating unit step of modulating each of the timing control data of the respective beams phase-controlled at the phase control step by using a same clock.

11. The computer program product according to claim 10, wherein
the optical writing device includes a first light source and a second light source,
the phase control step includes changing a phase of timing control data of a first beam emitted from the first light source by the phase change amount, and
the modulating step includes modulating the timing control data of the first beam in which the phase has been changed and timing control data of a second beam emitted from the second light source by using the same clock.

12. The computer program product according to claim 10, wherein
the optical writing device includes three or more light sources,
the phase control step includes changing phases of timing control data of beams other than a first beam out of three or more beams emitted from the three or more light sources by the phase change amount, and
the modulating step includes modulating timing control data of the first beam and the timing control data of the beams other than the first beam in which the phases have been changed at the phase control step by using the same clock.

13. The computer program product according to claim 10, the program codes when executed causing the computer to further execute
a phase-change-amount determining step of determining a change width for changing the phase change amount in the main scanning direction on the basis of timings when the respective two or more beams scan positions in the main scanning direction corresponding to two optical sensors, which are placed at both ends of the photoreceptor in the main scanning direction, wherein
the phase control step includes causing a difference in the phase within the change width.

\* \* \* \* \*